Nov. 6, 1928.

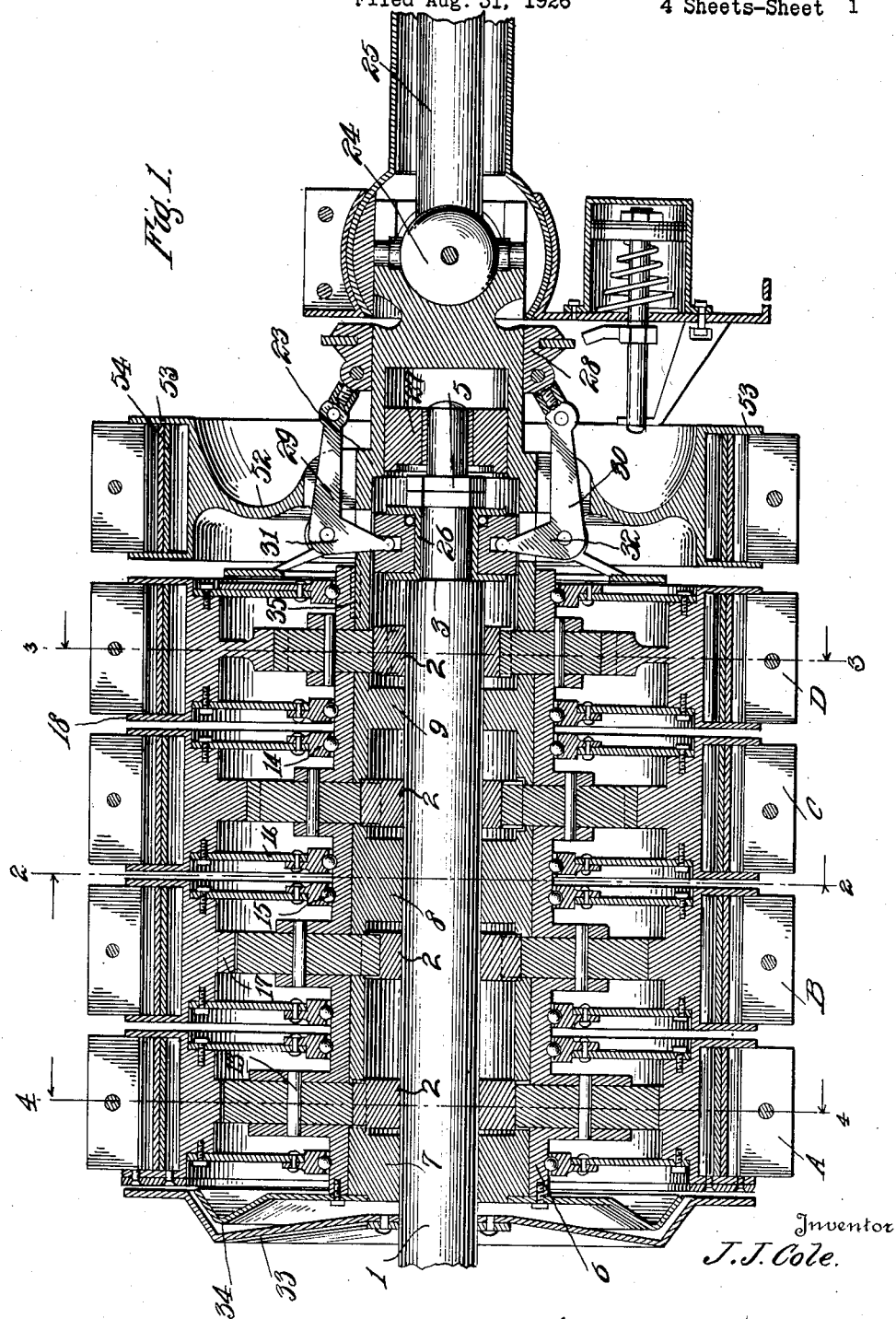

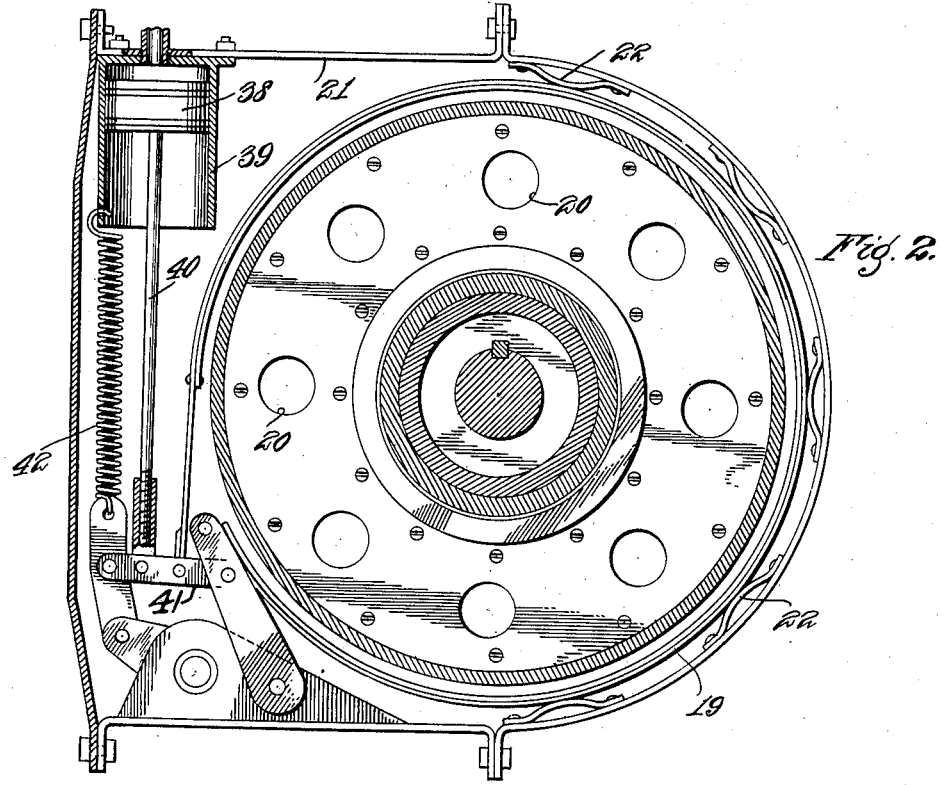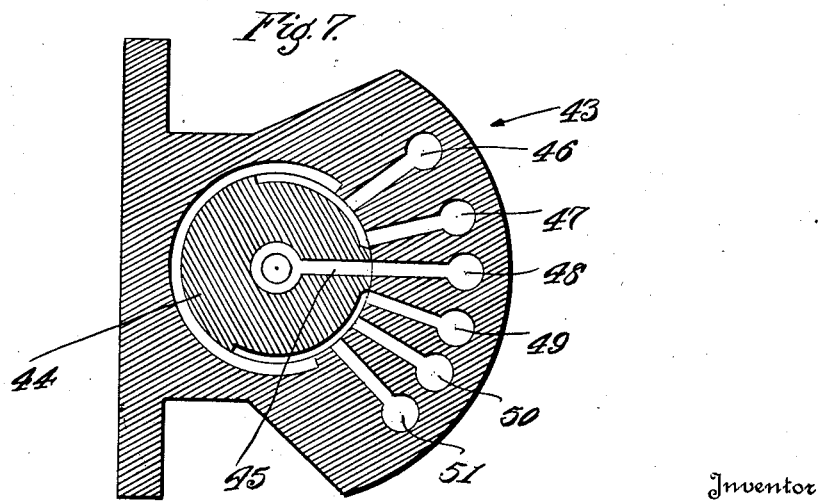

J. J. COLE 1,690,968

TRANSMISSION

Filed Aug. 31, 1926      4 Sheets-Sheet 3

Inventor
J. J. Cole.

By Mason Fenwick & Lawrence,
Attorneys

Nov. 6, 1928.                                                1,690,968
J. J. COLE
TRANSMISSION
Filed Aug. 31, 1926         4 Sheets-Sheet 4

Inventor
J. J. Cole.

By Mason Fenwick & Lawrence,
Attorneys

Patented Nov. 6, 1928.

1,690,968

UNITED STATES PATENT OFFICE.

JOSEPH J. COLE, OF FABER, VIRGINIA.

TRANSMISSION.

Application filed August 31, 1926. Serial No. 132,754.

This invention relates to a transmission.

It more particularly relates to a transmission adapted to be used upon motor vehicles, although of course, it may be used in other relations and for other purposes.

An object of the invention is to provide a transmission of the planetary type wherein the desired gear ratio may be quickly and easily obtained.

Another object is to provide a transmission which will comprise relatively few parts and which may be economically manufactured and readily installed.

Another object is to provide a transmission which will convey the torque imparted by the motor to the driving shaft to the driven shaft with a maximum capacity for a minimum of size.

Another object is to provide a transmission which will obviate the stripping of gears and thus be "foolproof".

Other objects and advantages will hereinafter appear.

An embodiment of the invention is illustrated in the accompanying drawings, wherein, Figure 1 shows a vertical longitudinal section through the transmission and universal, the driving shaft being shown in elevation.

Figure 2 is a view taken on line 2—2 of Figure 1.

Figure 7 is a detail view of a form of transmission actuator controller, which may be used with advantage for the transmission.

Figure 3:
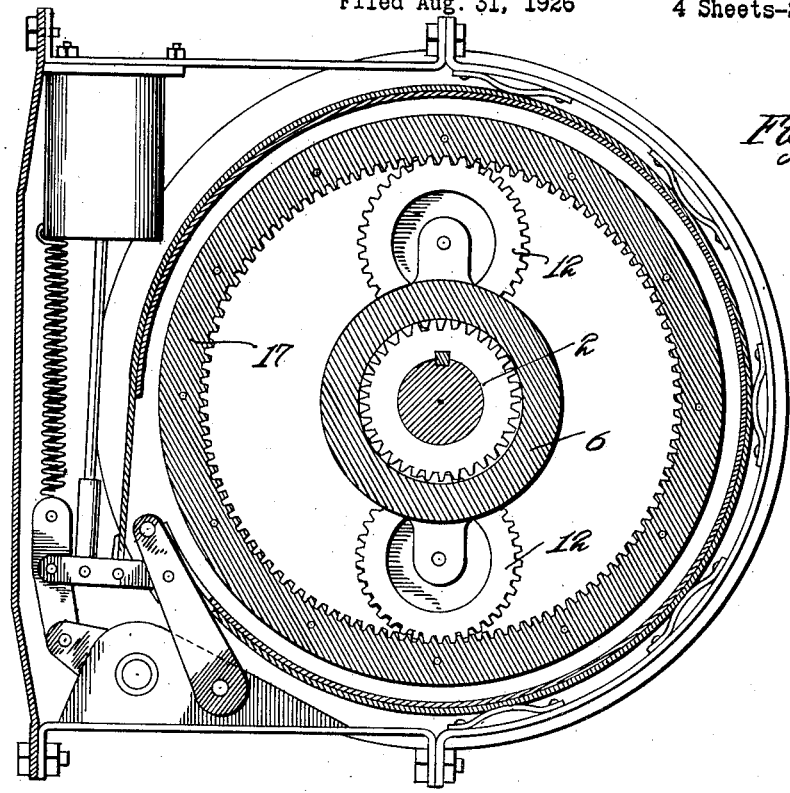
Figure 3 is a view taken approximately on line 3—3 of Figure 1, the driving pinion, the rotary gears and the supporting brackets therefor being shown in elevation for the purpose of clearness.
Figure 5:
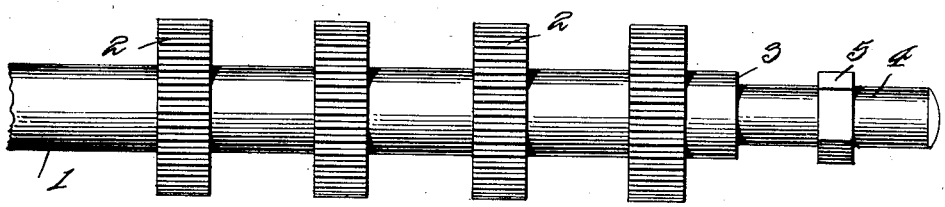
Figure 5, is an elevational view of the driving shaft showing the driving pinions arranged thereon.

The driving shaft 1 has arranged thereon in spaced relation driving pinions 2. These pinions are fixedly mounted upon the shaft so as to rotate therewith. Upon the inner end of the shaft a shoulder 3 and a reduced portion 4 is provided, the purposes of which will be more fully explained hereinafter.

A securing nut 5 is arranged upon the reduced portion 4 and held thereon by any suitable lock washer or nut.

A tubular sleeve 6 is adapted to fit over the driving shaft and driving pinions. This tubular sleeve is held in spaced relation to the driving shaft by spacing members 7, 8, and 9.

Pairs of projecting ears or brackets 10 are arranged upon the sleeve in spaced relation so as to correspond with the positions of the driving pinions 2. These ears or brackets project from opposite sides of the sleeve and those portions of the sleeve included between the brackets are cut away for a purpose to be hereinafter explained.

Ball race ways 11 extending circumferentially of the sleeve are provided upon its outer surface.

Rotatably mounted within the brackets 10 are rotary gears 12, the said gears varying in size so as to form the different gear ratios. These gears are arranged upon pins 13 supported in the brackets and are in constant mesh with a corresponding driving pinion 2.

It will thus be apparent that when the driving shaft 1 and driving pinion 2 are rotated by the operation of the engine that the rotary gears 12 will also rotate.

Arranged upon the tubular sleeve for rotation therearound are the driven clutch members.

These members each enclose one set of the rotary gears. The clutch members comprise cylindrical members 14 arranged to rotate upon the tubular sleeve 6. The inner circumference of the members is provided with ball race ways and ball bearings 15 are arranged between these race ways and the race ways 11 provided on the exterior surface of the sleeve 6.

Suitably secured by rivets or other means to flanges provided on the upper edges of the members 14 are annular members 16. Secured between the outer ends of the members 16 are orbit gears 17. These orbit gears mesh with the rotary gears 12. Upon opposite edges of the segment gears are upwardly projecting flanges 18 between which a clutch band 19 is adapted to be arranged.

The entire transmission is enclosed in a casing 21 as clearly shown in Figure 2. Bowed leaf springs 22 are arranged upon the inner side of the casing and bear against the clutch band 19.

The tubular sleeve 6 is keyed to a shaft 23, which is connected by a universal joint 24 to the propeller shaft 25 of the motor vehicle.

An annular collar 26 is arranged upon the reduced portion 4 of the shaft 1, being held between the shoulder 3 and the nut 5. The extreme outer end of the reduced portion of the shaft is supported by a bushing 27 and is adapted to have a sliding movement therein.

Slidably mounted upon the shaft 23 is a clutch thrust collar 28. This collar is connected to any suitable clutch operating mechanism such as a lever, or other means. Connected to the thrust collar are bell crank levers 29 and 30 which have the extremity of one arm thereof operably connected to a bushing arranged within the member 26. It will be clear that when the collar 28 is moved forwardly the bell crank arms will be rocked about their pivots 31 and 32 and will thus force the shaft 1 slightly rearwardly.

Upon the front part of the transmission a clutch is arranged. This clutch comprises a driving member 33 and a driven member 34. When the shaft 1 is moved rearwardly it will be obvious that the clutch members 33 and 34 will be brought into contact with one another.

Referring to Figure 3 it will be clear that the segment gear 17 will be constantly rotating since the driving pinion 2 is constantly rotating the gears 12. However should the clutch band 19 be contracted upon the outer surface of the orbit gear 17 the rotation of such gear will be stopped and the rotary gears 12 will then travel around the gear 17 which has become a fixed gear. When this condition prevails the tubular sleeve 6 will be rotated and will transmit rotary movement to the shaft 23 since the same is keyed thereto at 35.

Figure 4:
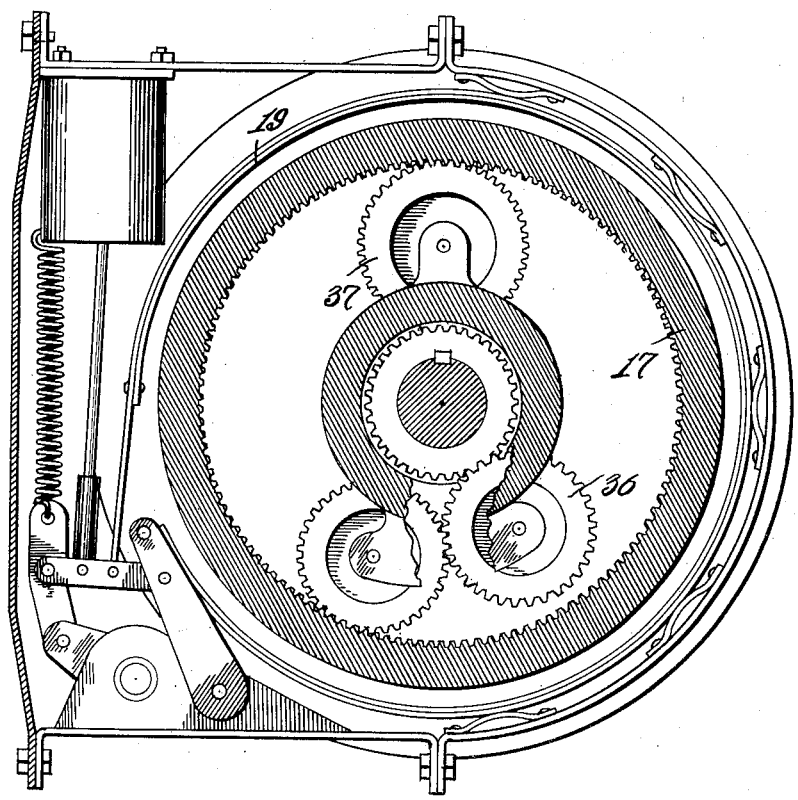
Figure 4 is a view taken approximately on line 4—4 of Figure 1 and shows the reverse gear mechanism, driving pinion, rotary gears and reverse gear in elevation for purposes of clearness.
Figure 6:
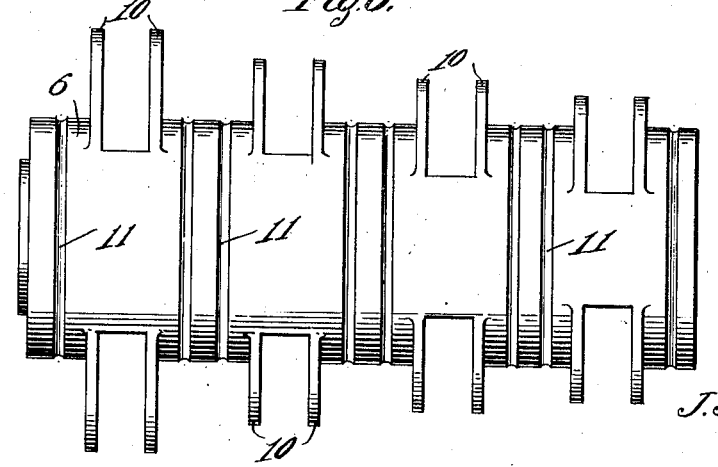
Figure 6 is an elevational view of the tubular sleeve, the rotary gears being omitted therefrom.

In Figure 4 the arrangement comprising the reverse gear is shown, this arrangement being similar to that just described. However the gear 36 being an idler will impart a reverse rotation to the rotary gear. The gear 37 in the reverse arrangement does not mesh with the driving pinion being merely for the purpose of supporting the segment gear 17.

In Figure 1, A, B, C and D indicate the reverse, low, second, and high gears respectively. It will be apparent that when it is desired to place any of the gear ratios in action all that is necessary is to contract the clutch band 19 upon the gear desired. Such contraction of the clutch band may be accomplished in any preferred manner, although a pneumatic arrangement is disclosed in the drawing. In the arrangement shown, a piston 38 operating in a cylinder 39 is connected by means of a stem 40 to a toggle arrangement 41, whereby when air is introduced into the cylinder the piston will be pushed downward together with the rod 40, which will tend to force the member 41 to the left away from the orbit gear 17.

In Figure 7 a form of controlling means 43 is shown which being of simple design would prove desirable to use in conjunction with the transmission. This control means comprises a rotatable supply port 44 adapted to be connected by a moveable connection 45 with a system of ports 46, 47, 48, 49, 50 and 51 connected respectively with the actuating means for the reverse, low, second, high direct drive and brake mechanisms.

In order to obtain a direct drive the thrust collar 28 is moved forwardly so as to pull the drive shaft 1 rearwardly. This operation will bring the clutch members 33 and 34 into operative engagement, thereby rotating the tubular sleeve 6 and in turn the shaft 23.

From the foregoing description it will be seen that the transmission disclosed enables four speeds forward to be obtained and also one speed in reverse. The neutral position is obtained by simply relieving the air pressure from all the clutches.

A circular member 52 is keyed or otherwise fixedly arranged upon the shaft 23. Upwardly projecting flanges 53 are provided upon each circumferential edge thereof to form a brake drum band. A brake 54 surrounds the annular space lying between the flanges 53 and is adapted to be contracted thereon in the same way that the clutch bands 19 are contracted upon the orbit gears.

Although a pneumatic actuating means has been shown and described it should be understood that levers, electrical, or other means could be substituted therefor.

Having described a specific embodiment of the invention the following claim is appended hereto with the understanding that the invention is susceptible to various modifications and adaptations within the scope of the said claim.

What I claim is:—

A transmission for conveying selectively with predetermined speed ratio, movement from a driving shaft to a driven shaft comprising driving pinions fixedly arranged upon the driving shaft in spaced longitudinal relation for rotation therewith, a sleeve encircling said driving members and said driving shaft in concentric spaced relation thereto, said sleeve being keyed to said driven shaft, a plurality of gears rotatably mounted upon said sleeve, each of said gears being adapted to mesh with a corresponding driving member, a plurality of members encircling said sleeve provided with an orbit gear on its inner circumference and with radially extending flanges upon each edge of the outer circumference, each of said members encircling a pair of the gears and driving members so that said gear will be in mesh with the said orbit gear, friction means arranged between the said flanges on the outer circumference of each of said members, means for selectively contracting said friction means upon the outer circumference of said member whereby the same will be held stationary and the sleeve will be rotated, thus transmitting the desired speed ratio to the drive shaft.

In testimony whereof I affix my signature.

JOSEPH J. COLE.